United States Patent
Hsu

(10) Patent No.: US 7,085,129 B2
(45) Date of Patent: Aug. 1, 2006

(54) SUPPORT APPARATUS

(75) Inventor: Chien-Shih Hsu, Taipei (TW)

(73) Assignee: Darfon Electronics Corp. (TW)

( * ) Notice: Subject to any disclaimer, the term of this patent is extended or adjusted under 35 U.S.C. 154(b) by 321 days.

(21) Appl. No.: 10/824,812

(22) Filed: Apr. 15, 2004

(65) Prior Publication Data

US 2004/0207598 A1    Oct. 21, 2004

(30) Foreign Application Priority Data

Apr. 17, 2003   (TW) .............................. 92108910 A

(51) Int. Cl.
*G06F 1/16* (2006.01)
(52) U.S. Cl. ...................... 361/683; 361/680; 361/681; 248/918; 312/223.1; 312/223.2
(58) Field of Classification Search ................. 361/683
See application file for complete search history.

(56) References Cited

U.S. PATENT DOCUMENTS

| | | | |
|---|---|---|---|
| 6,538,642 B1 | 3/2003 | Tsai | |
| 6,561,708 B1 * | 5/2003 | Lin | 400/495 |
| 6,585,217 B1 | 7/2003 | Huang et al. | |
| 6,614,649 B1 * | 9/2003 | Wang | 361/680 |
| 6,714,404 B1 * | 3/2004 | Wu | 361/680 |
| 6,785,126 B1 * | 8/2004 | Hazzard et al. | 361/680 |
| 6,898,075 B1 * | 5/2005 | Li et al. | 361/683 |
| 2002/0149908 A1 | 10/2002 | Tsai | |
| 2004/0033096 A1 * | 2/2004 | Choi et al. | 400/472 |
| 2004/0195305 A1 * | 10/2004 | Dotson | 235/145 R |

* cited by examiner

*Primary Examiner*—Lynn Feild
*Assistant Examiner*—Anthony q. Edwards
(74) *Attorney, Agent, or Firm*—Snell & Wilmer LLP

(57) ABSTRACT

A support apparatus includes a body, a first unit, a second unit, and a third unit. The first unit rotatably connects to the body. The second unit has a first end and a second end, and the first end of the second unit rotatably connects to the first unit. The third unit has a first end and a second end rotatably connecting to the body and the second unit respectively. When the first, second, and third units move with respect to one another and cooperate with the body to form a support configuration, the second end of the second unit and said body are substantially on a same plane so that the second unit supports the first unit for supporting a first electronic device. When the first, second, and third units form as a folded configuration, the first unit is folded on the body.

20 Claims, 6 Drawing Sheets

SUPPORT APPARATUS

CROSS-REFERENCE TO RELATED APPLICATIONS

This application claims priority to Taiwan Patent Application No. 092108910 entitled "Support Apparatus", filed on Apr. 17, 2003.

1. Field of Invention

The present invention generally relates to a support apparatus and, more particularly, to a support apparatus for use with an input apparatus to support another electronic device.

2. Background of the Invention

Since the advent of portable computers, more and more computer equipment of smaller size has been introduced in the market. For example, a Personal Digital Assistant (PDA) is one of the most popular forms of portable equipment. Unlike conventional computers, PDAs are not typically equipped with conventional keyboards, but receive input information by the pen input device or stylus on a display panel. In some cases, the PDA has a virtual keyboard that is displayed on the display area whereby the user inputs data by selecting keys on the keyboard using the pen stylus.

However, data input rates and responses of many PDA input processes are slow and insensitive compared with those of conventional keyboards. External keyboards have therefore been proposed as input devices for PDAs. When such external keyboards are not in use, the keyboard is detached from the PDA to improve portability and convenience. When data is being input with the external keyboard, the keyboard is typically connected to the PDA to improve input speed and comfortability. Another issue with external keyboards relates to physically supporting the palm-size and lightweight PDA, which is typically designed for hand-held use. When the PDA is put on a table, the PDA typically is not supported vertically, and the display angle may be difficult to adjust according to a user's need. It is therefore desirable to provide a support apparatus having the capability of supporting an electronic device that may also be easily converted from configuration to configuration.

SUMMARY OF THE INVENTION

One aspect of the present invention is to provide a support apparatus with a plurality of support units, which move with respect to one another to selectively form a folded configuration and a support configuration so as to improve portability and capability of supporting another electronic device.

Another aspect of the present invention is to provide a support apparatus for use with an input apparatus, such as a foldable keyboard. When the keyboard is folded, the support apparatus can be accommodated in the keyboard. When the keyboard is in use, the support apparatus is configured to support another electronic device, such as a PDA.

In a first embodiment, the present invention provides a support apparatus including a body, a first unit, a second unit, and a third unit. The first unit and the body are rotatably connected. The second unit has a first end and a second end, and the first end of the second unit rotatably connects to the first unit. The third unit has a first end and a second end rotatably connecting to the body and the second unit respectively. When the first, second, and third units move with respect to one another and cooperate with the body to form a support configuration, the second end of the second unit and the body are substantially on a same plane so that the second unit supports the first unit for supporting an electronic device. When the first, second, and third units form as a folded configuration, the first unit is folded on the body.

In a second embodiment, the present invention provides a support apparatus including a body, a first unit, a second unit, a third unit, and an auxiliary device. The first unit and the body are rotatably connected. The second unit and the auxiliary device rotatably connect to the first unit respectively. The third unit has a first end and a second end connecting to the second unit and the auxiliary device respectively. In such an arrangement, the first, second, and third units and the auxiliary device move with respect to one another. Therefore, when the first, second and third units and the auxiliary device cooperate with the body to form a support configuration, the first unit supports an electronic device. When the first, second, and third units and the auxiliary device form as a folded configuration, the first unit is folded on the body.

Furthermore, the support apparatus of the first embodiment or the second embodiment further includes an auxiliary electronic device, such as a radio frequency transmitter or an infrared transmitter, for assisting the supported electronic device in signal transmission.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION

The present invention provides a support apparatus with enhanced portability that is capable of quickly transforming from a folded configuration into a support configuration to support other electronic devices. FIGS. 1–4 illustrate preferred embodiments of the present invention.

Figure 1:
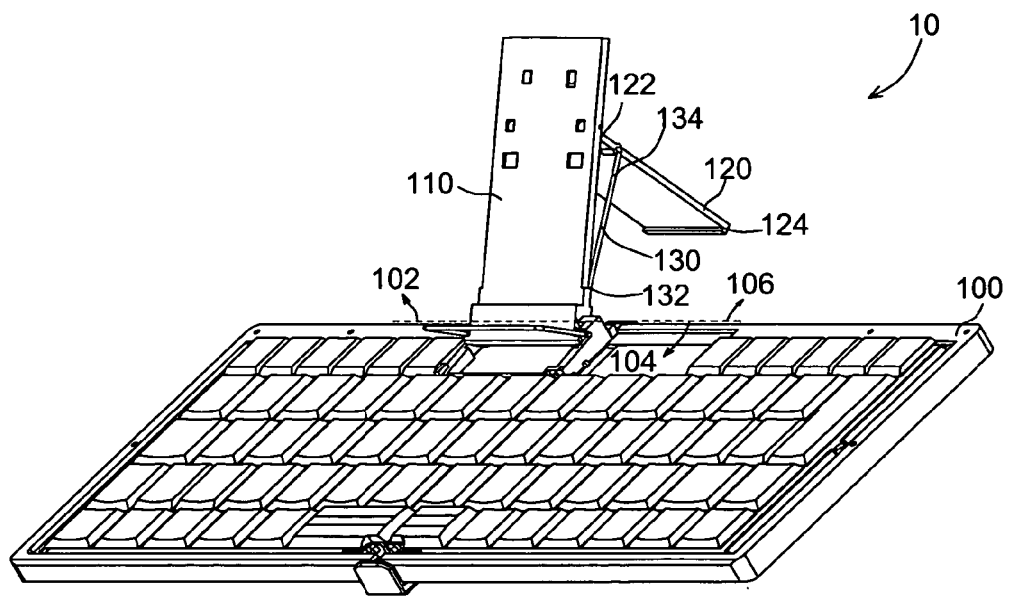
FIG. 1 illustrates a three-dimensional view of a support apparatus in accordance with a first embodiment of the present invention.

FIG. 1 illustrates a three-dimensional view of a support apparatus 10 in accordance with a first embodiment of the present invention. The support apparatus 10 includes a body 100, a first unit 110, a second unit 120 and a third unit 130. As shown in FIG. 1, the body 100 can be an input apparatus, such as a keyboard. The first unit 110 and the second unit 120 can be plate-like or frame-like supports. The third unit 130 can be a stick-like support with flexibility. The first unit 110 rotatably connects to the body 100, and the second unit 120 rotatably connects to the first unit 110. The third unit 130 has a first end 132 and a second end 134 rotatably connecting to the body 100 and the second unit 120 respectively. In other words, the first unit 110 and the third unit 130 respectively rotatably connect to the side of the keyboard housing.

Furthermore, as shown in FIG. 1, a reference axis 102 of the body 100 defines a first side 104 and a corresponding second side 106. The first unit 110 connects to the first side 104 of the body 100, and the third unit 130 connects to the second side 106 of the body 100. The second unit 120 has a first end 122 and a second end 124, and the first end 122 of the second unit 120 rotatably connects to the first unit 110. The second end 134 of the third unit 130 connects to a portion close to the first end 122 of the second unit 120. In such an arrangement, the first, second, and third units (110, 120, and 130) move with respect to one another and cooperate with the body 100 to selectively form a support configuration and a folded configuration.

Figure 2A:
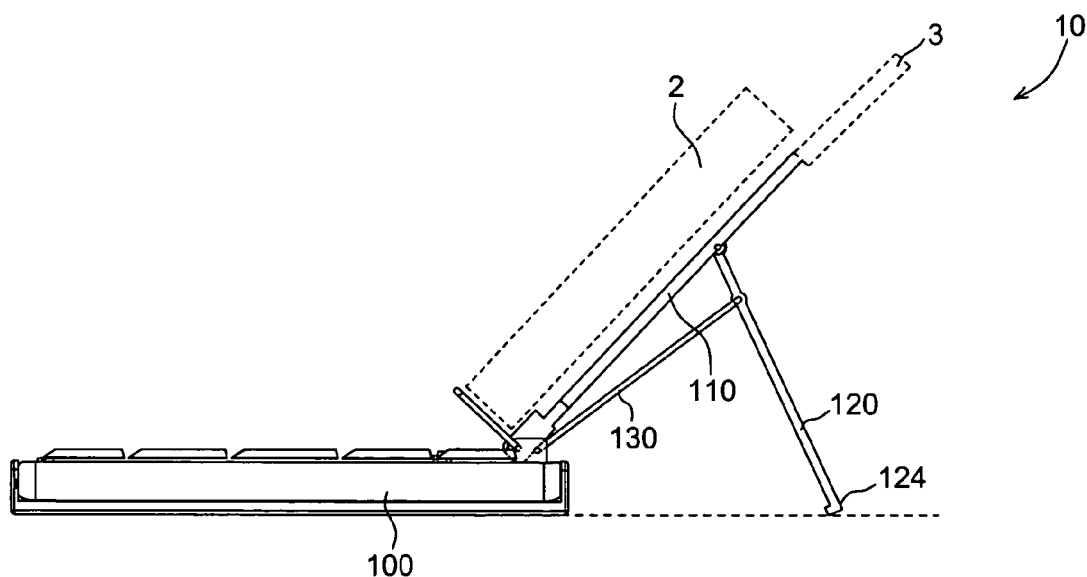
FIGS. 2A, 2B, and 2C illustrate side views of the support apparatus in a support configuration, transition state, and a folded configuration in accordance with the first embodiment of the present invention, respectively.
Figure 2B:
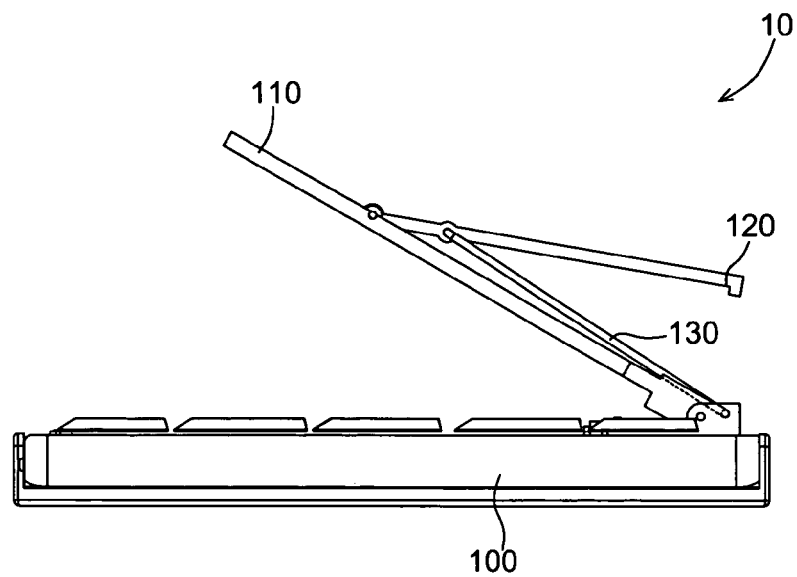
Figure 2C:
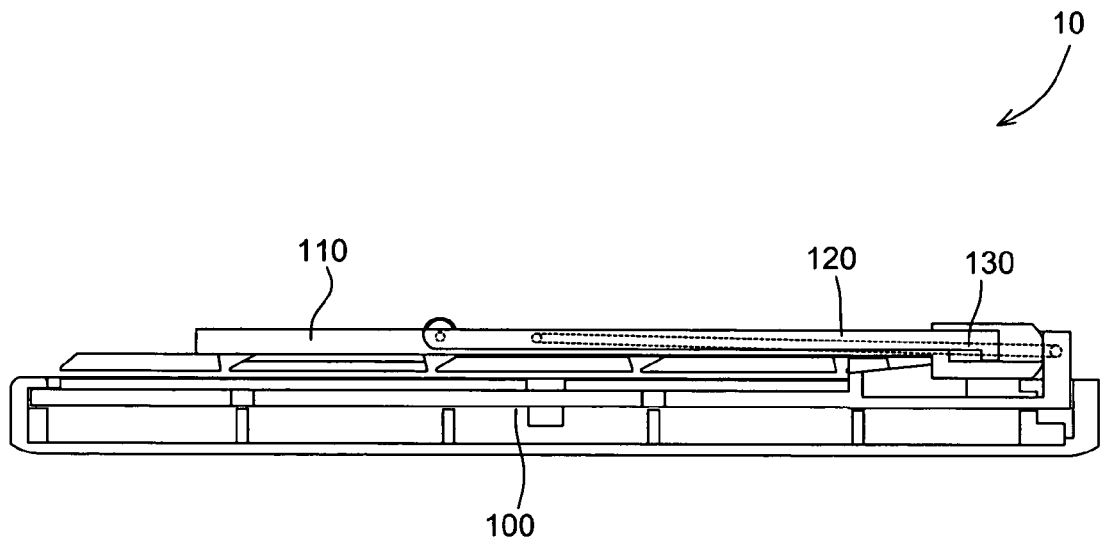

FIGS. 2A, 2B, and 2C illustrate side views of the support apparatus 10 in the support configuration, transition state, and the folded configuration in accordance with the first embodiment of the present invention, respectively. As shown in FIG. 2A, the first unit 110, the second unit 120, and the third unit 130 move with respect to one another to form the support configuration, the second unit 120 supports the first unit 110, and the first unit 110 is configured to support an electronic device 2, such as a PDA. In the support configuration, the second end 124 of the second unit 120 and the body 100 are substantially on a same plane, such as the surface of a table.

Referring to FIG. 2B, when the input apparatus 100 is not in use, the support apparatus 10 can be folded to minimize the required storage space. In other words, when the support apparatus 10 is required to be in the folded configuration, a user can apply a force on the first unit 110 or the second unit 120 to transform the support apparatus 10 into the folded configuration due to the corresponding movements of the first, second, and third units. As shown in FIG. 2C, when the first unit 110, the second unit 120, and the third unit 130 cooperate with the body 100 to form the folded configuration, the first unit 110 is folded on the body 100. Moreover, by designing shapes and structures of the first unit 110, the second unit 120, the third unit 130, the second unit 120 and the first unit 110 can together form a plane, as shown in FIG. 2C. In other words, the shape and thickness of the second unit 120 and the third unit 130 can be designed with respect to those of the first unit 110, for example, the first unit 110 with a recess or a hole for accommodating the second unit 120 and the third unit 130, and therefore, the required space as the support apparatus 10 is folded is further reduced.

Figure 3A:
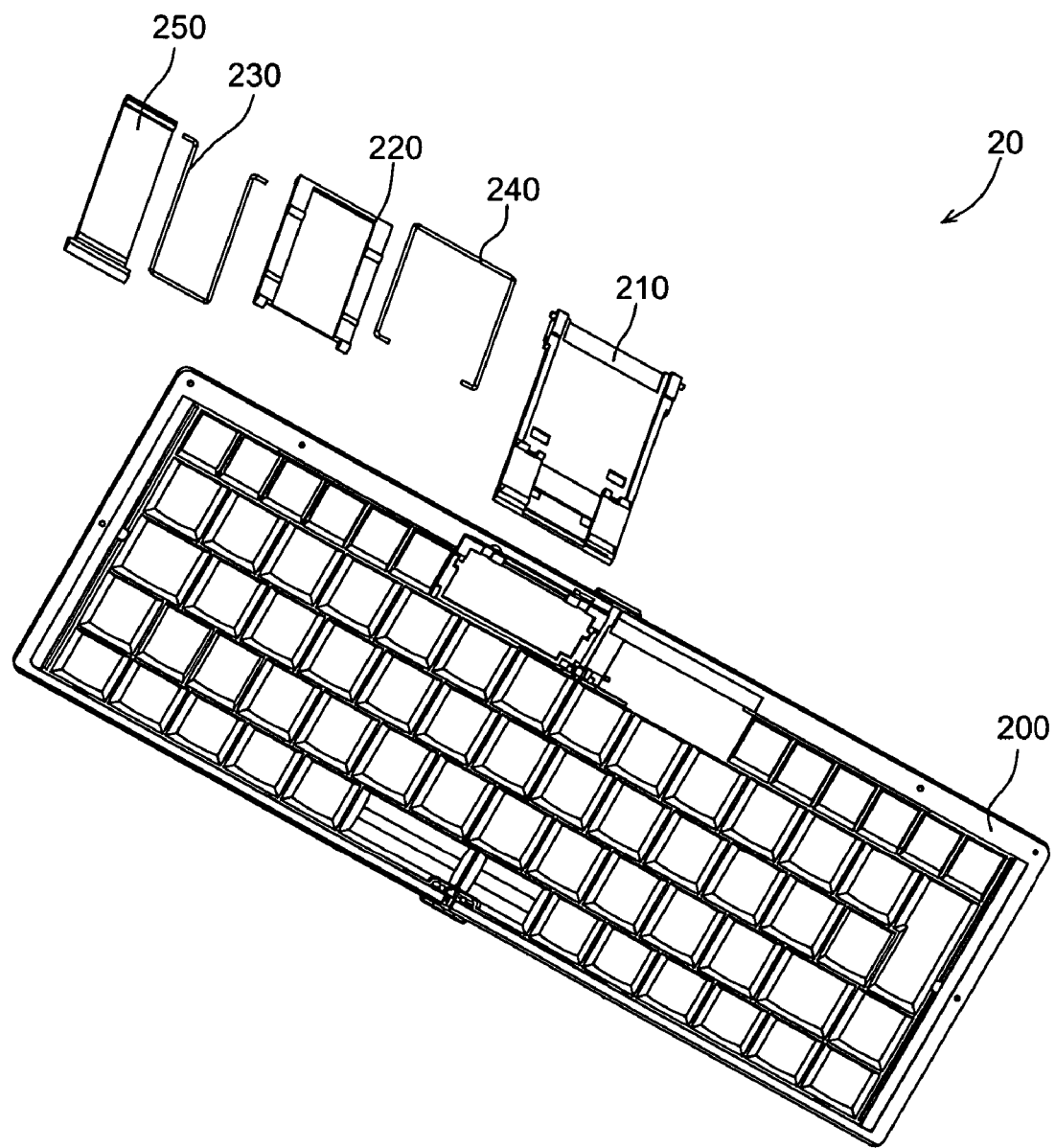
FIGS. 3A and 3B illustrate an explosive view and a three-dimensional view of a support apparatus in accordance with a second embodiment of the present invention, respectively.
Figure 3B:
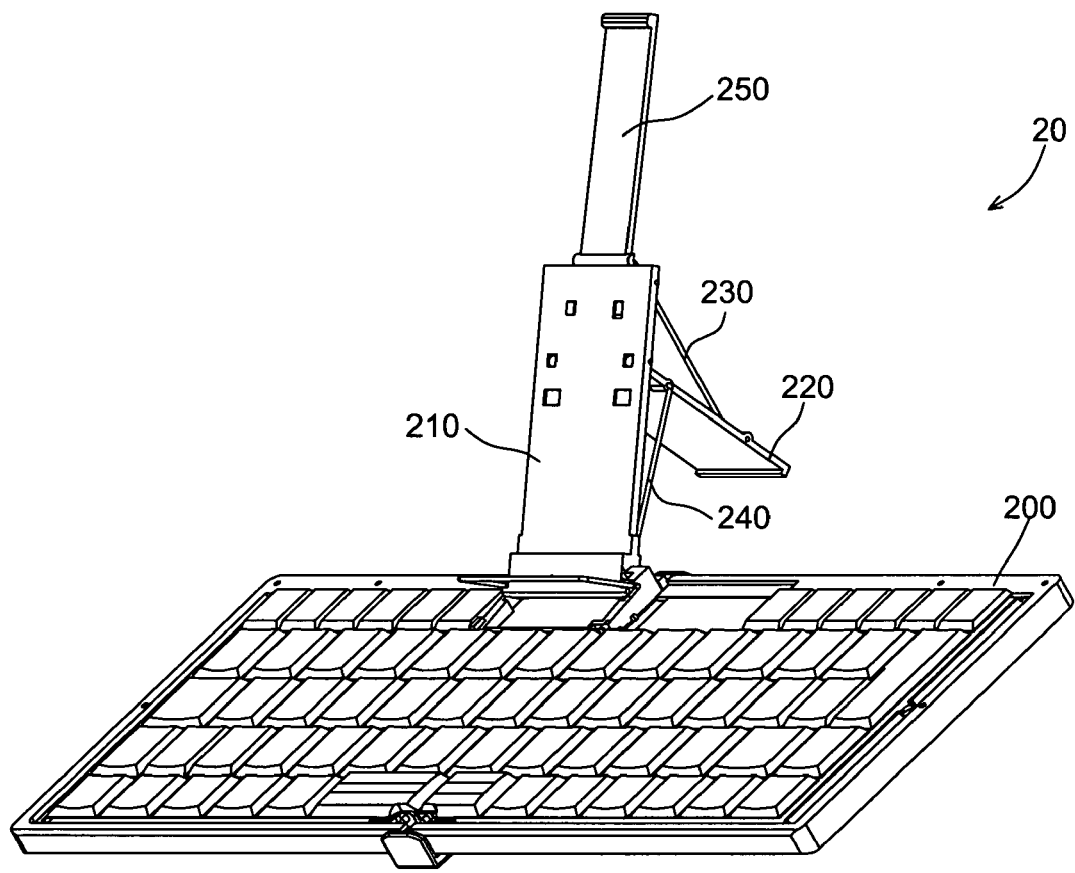

Referring to FIGS. 3A and 3B, an explosive view and a three-dimensional views of a support apparatus 20 in accordance with a second embodiment of the present invention are illustrated. In the second embodiment, the present invention provides a support apparatus 20 including a body 200, a first unit 210, a second unit 220, a third unit 230, and an auxiliary device 250. The support apparatus 20 further includes an optional fourth unit 240. As shown in FIG. 3A, the body 200 can be an input apparatus, such as a keyboard. The first unit 210 and the second unit 220 can be plate-like or frame-like supports. The third unit 230 and the fourth unit in FIG. 3A are frame-like supports with flexibility. However, the third unit 230 and the fourth unit 240 can also be a plurality of stick-like supports with flexibility.

Figure 4A:
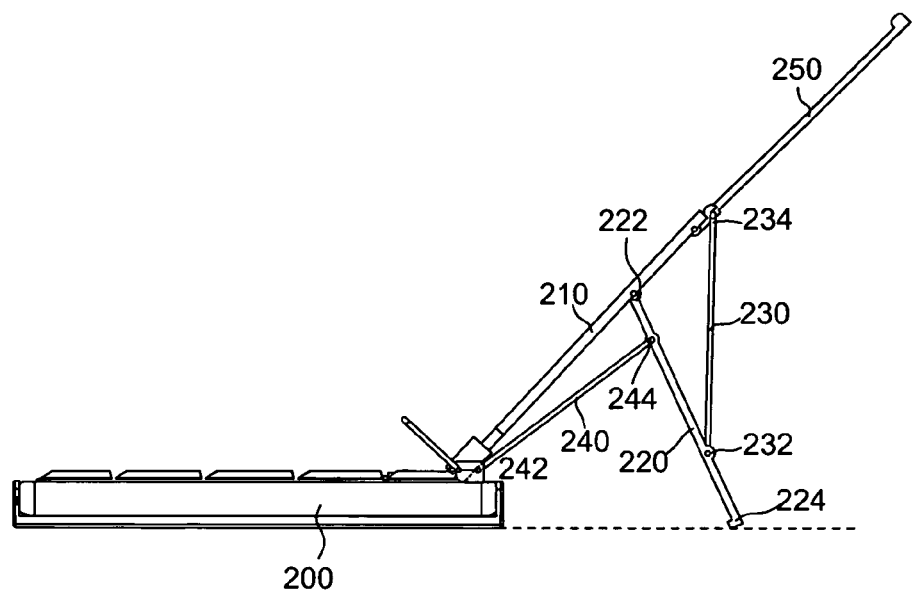
FIGS. 4A, 4B, and 4C illustrate side views of the support apparatus in a support configuration, transition state, and a folded configuration in accordance with the second embodiment of the present invention, respectively.
Figure 4B:
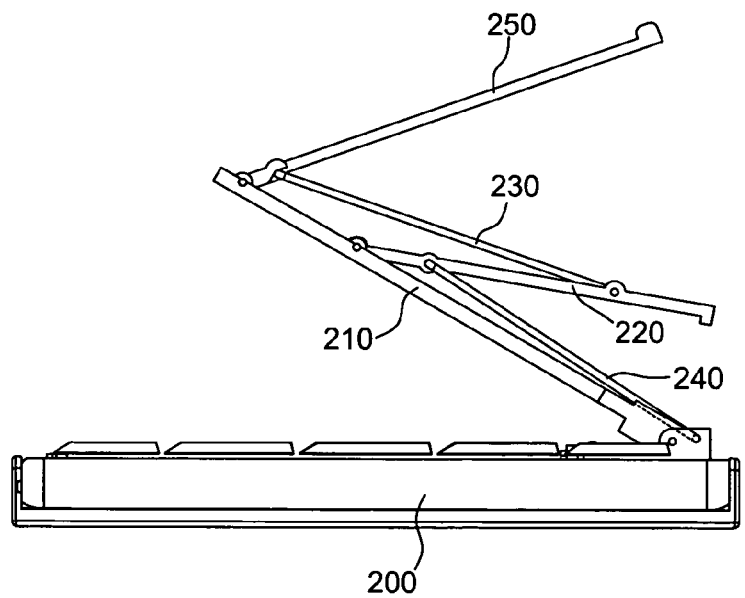
Figure 4C:
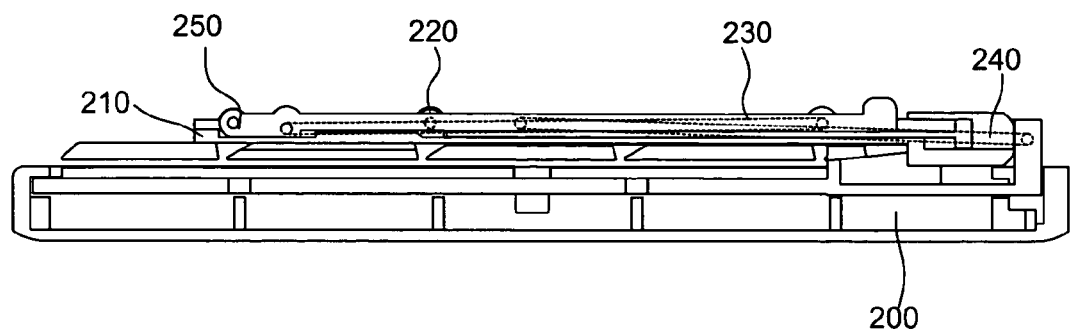

FIGS. 4A, 4B, and 4C illustrate side views of the support apparatus 20 in a support configuration, transition state, and a folded configuration in accordance with the second embodiment of the present invention, respectively. As shown in FIG. 4A, the first unit 210 rotatably connects to the body 200. The second unit 220 and the auxiliary device 250 rotatably connect to the first unit 210. The third unit 230 having a first end 232 and a second end 234, which connect to the second unit 220 and the auxiliary device 250 respectively. In such an arrangement, the first unit 210, the second unit 220, the third unit 230, and the auxiliary device 250 move with respect to one another. When the first unit 210, the second unit, 220, the third unit 230, and the auxiliary device 250 cooperate with the body 200 to form the support configuration, the first unit 210 is configured to support an electronic, such as a PDA.

Referring to FIG. 4A again, the second unit 220 has a first end 222 and a second end 224. The first end 222 of the second unit 220 connects to the first unit 210. When the first unit 210 supports the electronic device, the second end 224 of the second unit 220 and the body are substantially on a same plane. The first end 232 and the second end 234 of the third unit 230 respectively rotatably connect to the second unit 220 and the auxiliary device 250. The fourth unit 240 has a first end 242 and a second end 244 connecting to the body 200 and the second unit 220, respectively. Therefore, the first unit 210, the second unit 220, the third unit 230, the fourth unit 240 and the auxiliary device 250 move with respect to one another. It is noted that the fourth unit 240 is selectively disposed. In other words, without the fourth unit 240, the first, second, and third units (210, 220, and 230) and the auxiliary device 250 can also move with respect to one another. The fourth unit 240 is provided to further assist the second unit 220 in supporting the first unit 210.

Moreover, the first end 232 of the third unit 230 rotatably connects to the second unit 220, and the second end 234 of the third unit 230 movably and rotatably connects to the auxiliary device 250. In other words, the present invention implements engagement mechanism, such as hole and pivot, to achieve the rotatable connection between related support units. The present invention can also apply engagement mechanism, such as groove and pivot, to achieve the movable rotatable connection between related support units. For example, since the third unit 230 movably and rotatably connects to the auxiliary device 250, by adjusting the relative position of connection between the third unit 230 and the auxiliary device 250, the support angle of the auxiliary device 250 can be manipulated. Therefore, a greater variety of applications of the support apparatus are made possible. It is noted that the engagement mechanism of related support units or the auxiliary device is not limited to those, such as hole and pivot, illustrated in the embodiments. Other modifications of the engagement mechanism are intended to be included in the scope of the present invention.

Furthermore, the auxiliary device 250 can be an auxiliary unit for assisting in supporting the electronic device when the support apparatus 20 is in the support configuration. The support apparatus 10 or 20 can further include an auxiliary electronic device for assisting the supported electronic device in signal transmission. For example, the auxiliary electronic device can be a radio frequency transmitter or an infrared transmitter to assist the PDA in signal transmission. It is noted that in the first embodiment, the auxiliary electronic device 3 is disposed on the top end of the first unit 110. When the first unit 110 supports the PDA, the auxiliary electronic device assists the PDA in signal transmission. In the second embodiment, the auxiliary device 250 itself can be the auxiliary electronic device, or act as the auxiliary unit to have an additional device disposed thereon.

The movement relationship among the body 200, the first unit 210, the second unit 220, and the fourth unit 240 is similar to that of the body 100, the first unit 110, the second unit 120, and the third unit 130. Therefore, the disposition of the fourth unit 240 with respect to the first unit 210, and the second unit 220 is not deliberated hereinafter.

Figure 4D:
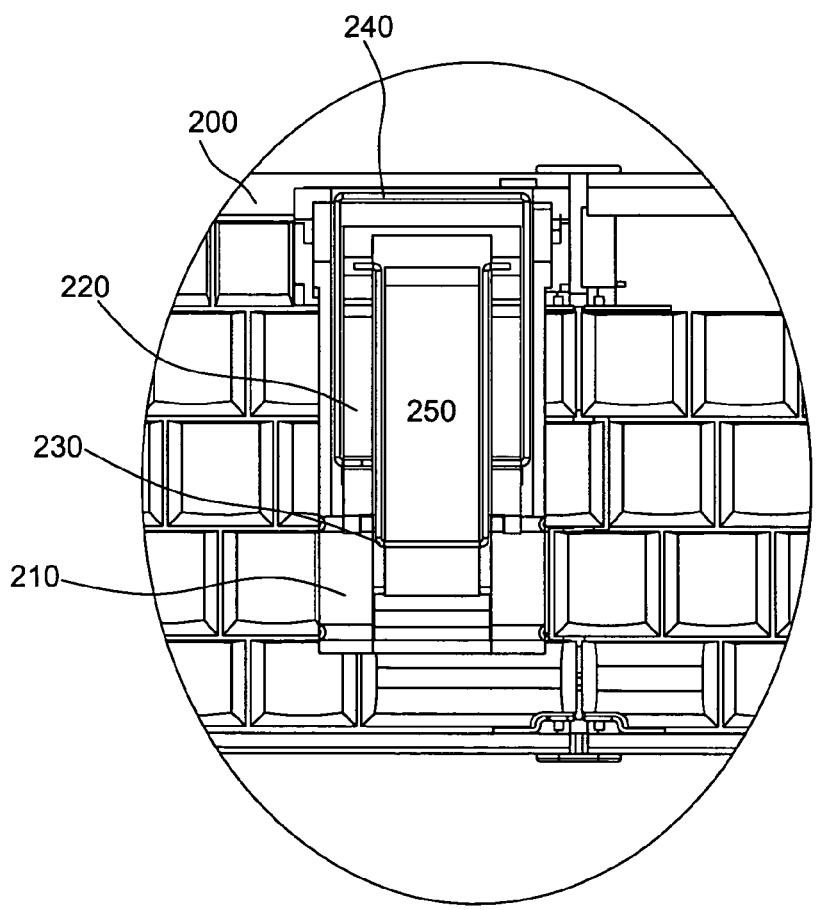
FIG. 4D illustrates a partially enlarged top view of a portion of the apparatus illustrated in FIG. 4C.

Referring to FIGS. 4B and 4C, when the first unit 210, the second unit 220, the third unit 230, and the auxiliary device 250 cooperate with the body 200 to form the folded configuration, the first unit 210 is folded on the body 200 (as shown in FIG. 4C). Therefore, when the input apparatus 100 is not in use, the support apparatus 20 is folded to minimize the required storage space. When the support apparatus 20 is intend to be folded, a user can apply a force on the auxiliary device 250 to transform the support apparatus 20 into the folded configuration due to the corresponding movements of the first, second, and third units, and the auxiliary device. Moreover, by designing shapes and structures of the first unit 210, the second unit 220, and the auxiliary device 250, the first unit 210, the second unit 220, and the auxiliary device 250 can together form a plane, as shown in FIG. 4C. As shown in FIG. 4D, a partial enlarged view of the support apparatus 20 in the folded configuration is illustrated. The support apparatus 10 or 20 in the folded configuration can facilitate the applications of the foldable keyboard. For example, when the keyboard is not in use, the support apparatus and key switches can be accommodated together in the keyboard housing to enhance the portability. When the keyboard is in use, the corresponding movements of related support units can quickly form the support configuration.

Although specific embodiments have been illustrated and described, it will be obvious to those skilled in the art that various modifications may be made without departing from what is intended to be limited solely by the appended claims.

I claim:

1. A support apparatus, comprising:
   a body;
   a first unit rotatably connecting to said body;
   a second unit having a first end and a second end, said first end of said second unit rotatably connecting to said first unit; and
   a third unit having a first end and a second end rotatably connecting to said body and said second unit respectively;
   wherein said second end of said second unit and said body are substantially on a same plane so that said second unit supports said first unit for supporting a first electronic device when said first, second, and third units move with respect to one another and cooperate with said body to form a support configuration, and said first unit is folded on said body when said first, second, and third units form as a folded configuration.

2. The support apparatus of claim 1, wherein said body is an input device.

3. The support apparatus of claim 1, wherein a reference axis of said body defines a first side and a second side, said first unit connects to said first side of said body and said third unit connects to said second side of said body.

4. The support apparatus of claim 1, wherein said second end of said third unit connects to a portion close to said first end of said second unit.

5. The support apparatus of claim 1, wherein said first unit and said second unit substantially form a plane when said first, second, and third units move with respect to one another transforming from said support configuration into said folded configuration.

6. The support apparatus of claim 1, further comprising an auxiliary device connecting to said first unit and configured to assist in supporting said first electronic device.

7. The support apparatus of claim 6, further comprising a fourth unit having a first end and a second end connecting to said second unit and said auxiliary device respectively so that said auxiliary device, said second unit, and said third unit move with respect to one another.

8. The support apparatus of claim 1, further comprising a second electronic device for assisting said first electronic device in signal transmission.

9. The support apparatus of claim 8, wherein said second electronic device comprises a radio frequency transmitter or an infrared transmitter.

10. A support apparatus, comprising:
    a body;
    a first unit rotatably connecting to said body;
    a second unit rotatably connecting to said first unit;
    an auxiliary device rotatably connecting to said first unit; and
    a third unit having a first end and a second end connecting to said second unit and said auxiliary device respectively;
    wherein said first, second, and third units and said auxiliary device move with respect to one another, and wherein said first unit supports a first electronic device when said first, second, and third units and said auxiliary device cooperate with said body to form a support configuration, and said first unit is folded on said body when said first, second, and third units and said auxiliary device form as a folded configuration.

11. The support apparatus of claim 10, wherein said body is an input device.

12. The support apparatus of claim 11, wherein said second unit has a first end and a second end, said first end of said second unit connects to said first unit, and said second end of said second unit and said body are substantially on a same plane when said first unit supports said first electronic device.

13. The support apparatus of claim 11, wherein said auxiliary device comprises an auxiliary unit for assisting in supporting said first electronic device.

14. The support apparatus of claim 11, further comprising a second electronic device for assisting said first electronic device in signal transmission.

15. The support apparatus of claim 14, wherein said second electronic device comprises a radio frequency transmitter or an infrared transmitter.

16. The support apparatus of claim 14, wherein said second electronic device is disposed on said auxiliary device.

17. The support apparatus of claim 10, wherein said first end of said third unit rotatably connects to said second unit, and said second end of said third unit movably and rotatably connects to said auxiliary device.

18. The support apparatus of claim 10, further comprising a fourth unit having a first end and a second end connecting to said body and said second unit respectively, wherein said first, second, third, and fourth units and said auxiliary device move with respect to one another.

19. The support apparatus of claim 18, wherein a reference axis of said body defines a first side and a second side, said first unit connects to said first side of said body and said fourth unit connects to said second side of said body.

20. The support apparatus of claim 19, wherein said second unit has a first end and a second end, said first end of said second unit connects to said first unit, and said second end of said fourth unit connects to a portion close to said first end of said second unit.

* * * * *